: US 7,360,973 B2
(45) Date of Patent: Apr. 22, 2008

(54) APPARATUS FOR MOUNTING A DRILL ON A PIPE

(76) Inventor: Gordon Henry Turner, 15 Aylesham Way, Yateley, Hampshire GU46 6NR (GB)

( * ) Notice: Subject to any disclaimer, the term of this patent is extended or adjusted under 35 U.S.C. 154(b) by 437 days.

(21) Appl. No.: 10/484,733

(22) PCT Filed: Jul. 26, 2002

(86) PCT No.: PCT/GB02/03434

§ 371 (c)(1),
(2), (4) Date: Aug. 19, 2004

(87) PCT Pub. No.: WO03/011534

PCT Pub. Date: Feb. 13, 2003

(65) Prior Publication Data

US 2005/0042050 A1   Feb. 24, 2005

(30) Foreign Application Priority Data

Jul. 26, 2001 (GB) .................................. 0118234.4
Feb. 14, 2002 (GB) .................................. 0203543.4

(51) Int. Cl.
*B23B 41/08* (2006.01)
(52) U.S. Cl. ........................................ 408/92; 408/103
(58) Field of Classification Search .................. 408/76, 408/79, 92, 103, 108, 109, 234, 110, 111; *B23B 41/08*
See application file for complete search history.

(56) References Cited

U.S. PATENT DOCUMENTS

| 20,469 | A | * | 6/1858 | Daggett | ....................... | 408/101 |
| 309,085 | A | | 12/1884 | Payne | | |
| 436,609 | A | | 9/1890 | Mueller | | |
| 515,976 | A | * | 3/1894 | Smith | ....................... | 137/15.14 |
| 2,024,390 | A | | 12/1935 | Ruesch | | |
| 2,412,458 | A | * | 12/1946 | Kivley | ....................... | 408/79 |
| 2,412,459 | A | * | 12/1946 | Stull | ............................ | 408/79 |
| 2,820,377 | A | * | 1/1958 | Buck | ............................ | 408/76 |
| 2,825,143 | A | * | 3/1958 | Polivka | ....................... | 33/520 |
| 3,461,750 | A | * | 8/1969 | Brown et al. | .................. | 408/56 |
| 3,741,670 | A | | 6/1973 | Wood | | |
| 3,762,829 | A | | 10/1973 | Yilmaz | | |
| 3,847,501 | A | * | 11/1974 | Doty | ........................... | 408/108 |
| 3,877,831 | A | * | 4/1975 | Maroschak | .................. | 408/32 |

(Continued)

FOREIGN PATENT DOCUMENTS

DE          150703          9/1981

(Continued)

*Primary Examiner*—Daniel W. Howell
(74) *Attorney, Agent, or Firm*—Jackson Walker, LLP

(57) ABSTRACT

A V-shaped frame 102 is attached to a pipe 100 to be drilled. The frame may be used with larger pipes by attaching a removable extension plates 120 to the arms 104 106 of the V-shaped frame, thereby increasing the size of the recess between the arms 104, 106. The apparatus may be fixed to the pipe 100 by a chain 110 which connects to the platform 102 and extends around the pipe 100, or by attaching clips to the frame and attaching the clips to the surface of the pipe by screws etc. To attach the apparatus to a pipe having a corrugated outer surface, clamp members 340 extend into the grooves 308" of the corrugations to grip the groove walls 316.

5 Claims, 18 Drawing Sheets

U.S. PATENT DOCUMENTS

| | | | | |
|---|---|---|---|---|
| 3,910,713 | A * | 10/1975 | Maroschak | 408/1 R |
| 3,922,107 | A | 11/1975 | Fowler | |
| 3,957,386 | A * | 5/1976 | Lupke | 408/50 |
| 3,969,036 | A * | 7/1976 | Hougen | 408/76 |
| 4,047,827 | A * | 9/1977 | Hougen | 408/76 |
| 4,094,612 | A * | 6/1978 | Krieg | 408/92 |
| 4,105,358 | A | 8/1978 | Walker | |
| 4,219,293 | A * | 8/1980 | Licht | 408/1 R |
| 4,390,309 | A | 6/1983 | Fangmann | |
| 4,533,284 | A | 8/1985 | Agius | |
| 4,936,720 | A | 6/1990 | Dolatowski | |
| 5,051,044 | A | 9/1991 | Allen | |
| 5,209,614 | A * | 5/1993 | Matthews | 408/1 R |
| 5,400,492 | A * | 3/1995 | Hodgson et al. | 29/402.08 |
| 5,713,702 | A | 2/1998 | Turner | |
| 5,919,009 | A | 7/1999 | Stephenson | |
| 6,012,877 | A * | 1/2000 | McCowin et al. | 408/1 R |
| 6,050,753 | A | 4/2000 | Turner | |
| 6,761,511 | B2 * | 7/2004 | Turner | 408/92 |
| 7,125,206 | B2 * | 10/2006 | Turner | 408/92 |

FOREIGN PATENT DOCUMENTS

| | | |
|---|---|---|
| EP | 1088619 | 4/2001 |
| JP | 124503 | 7/1984 |
| JP | 03-196907 A * | 8/1991 |
| WO | WO 98/16353 | 4/1998 |

* cited by examiner

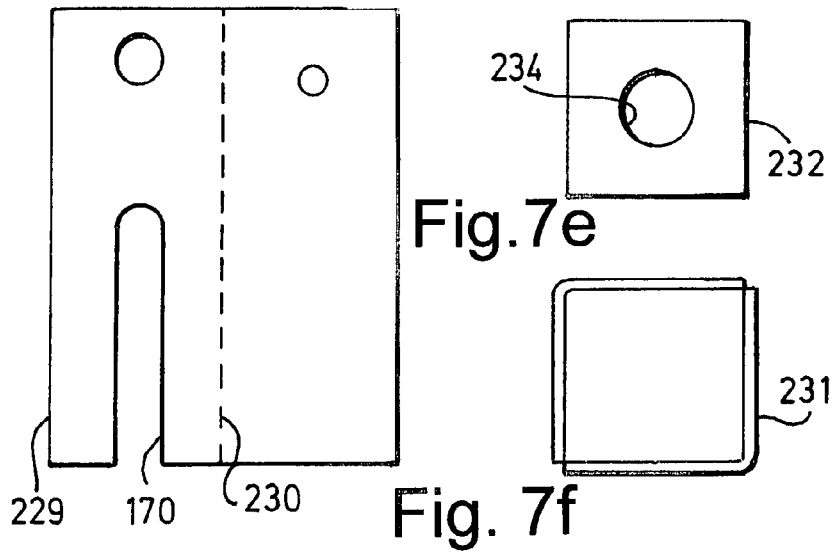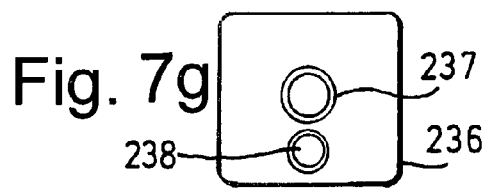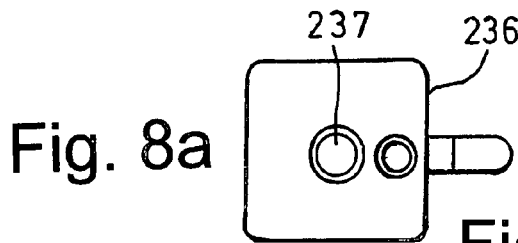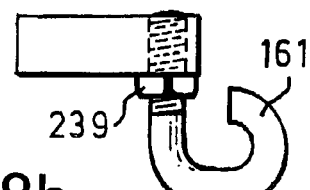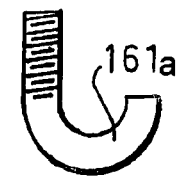

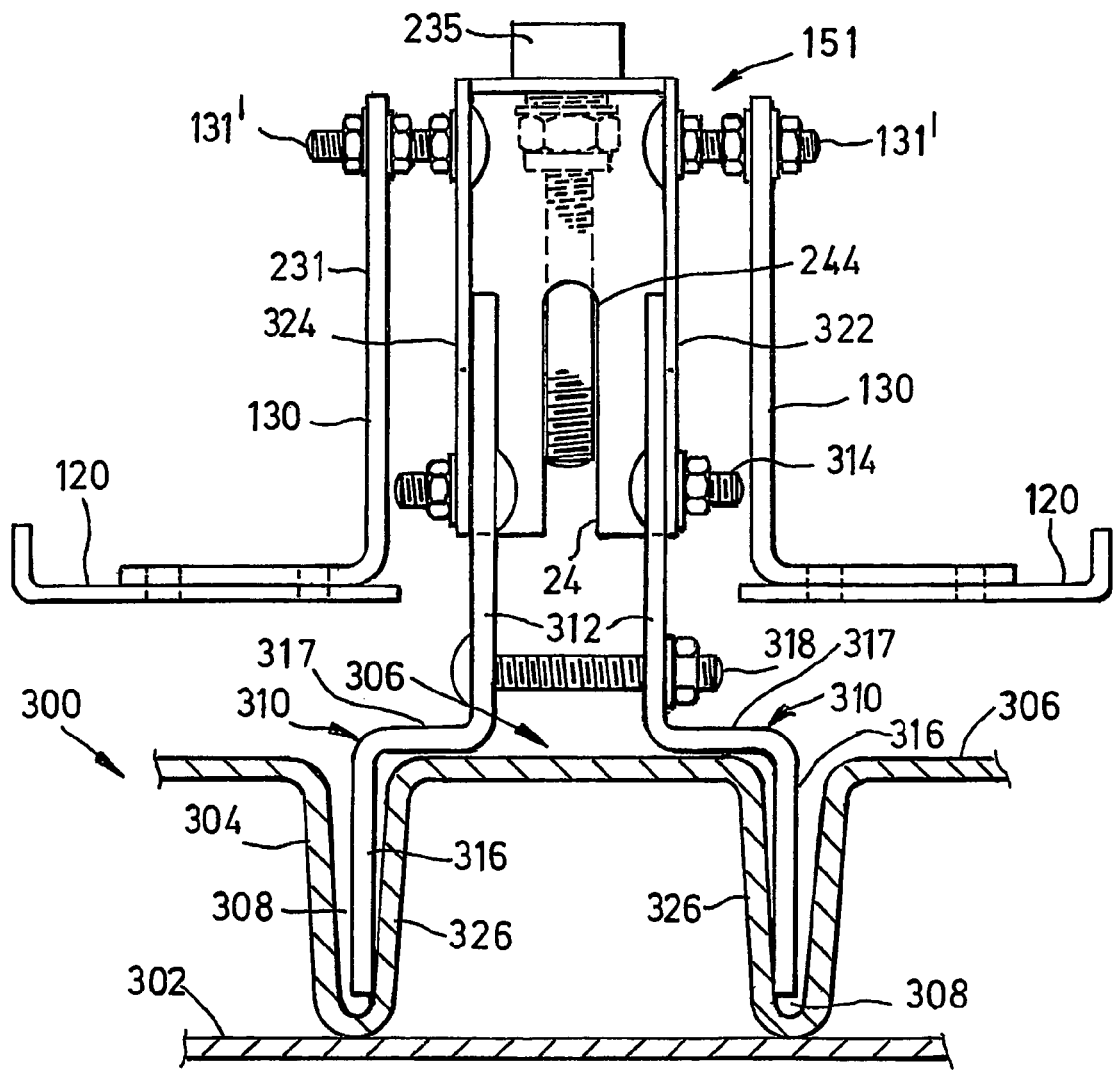
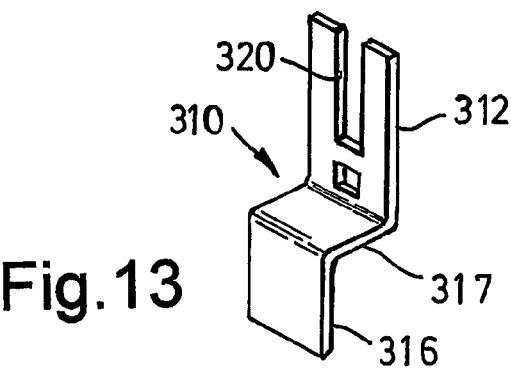
Fig. 12
Fig. 13

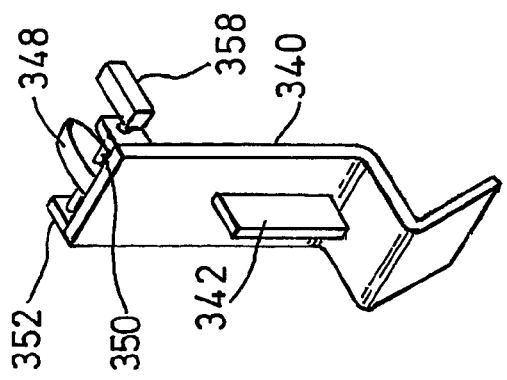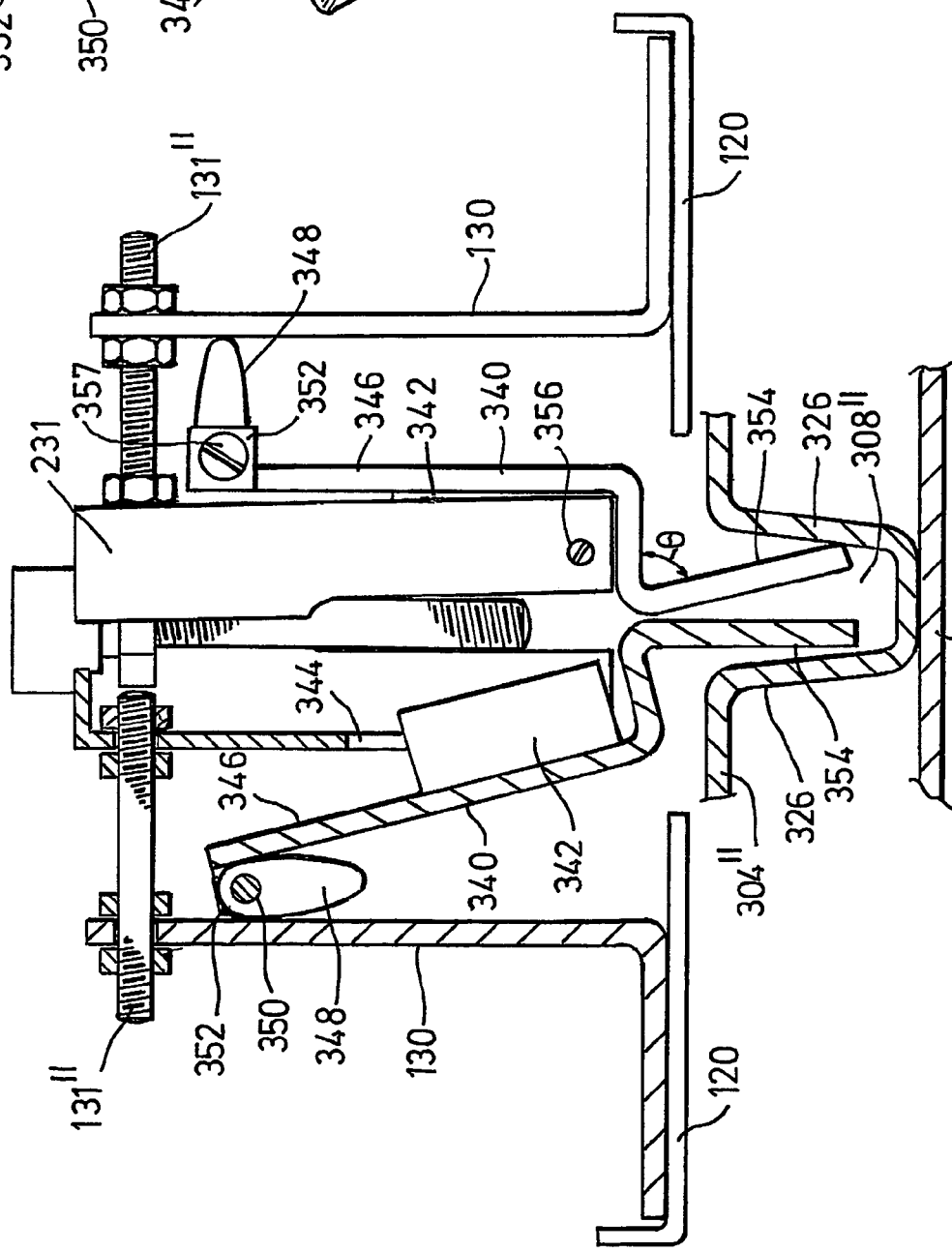

APPARATUS FOR MOUNTING A DRILL ON A PIPE

This application claims priority to International Application No. PCT/GB02/03434, filed Jul. 26, 2002; and to UK Application No. 0118234.2, filed Jul. 26, 2001; and to UK Application No. 0203543.4, filed Feb. 14, 2002.

This invention relates to an apparatus for mounting a drill on a pipe, in particular to an apparatus adapted to cope with pipes of large diameter.

One known method of holding a drill steadily against a pipe is using a magnetic system. This would include, for example, an electromagnetic holder, which when energised, holds a drill firmly against a metallic pipe, so that a hole may be drilled in a defined position in the pipe. However, a magnetic holder suffers from several major problems. It cannot be used with pipes made from a non-magnetic material, such as concrete, plastic, stainless steel, brass or clay. It cannot be used in environments which are particularly sensitive to electrical or magnetic fields, such as radar installations or computer factories. A separate safety chain has to be used as well, because in the event of a power failure to the electromagnetic clamp, care needs to be taken to ensure that the entire apparatus does not fall and injure operators who may be standing nearby. Also, magnetic mountings cannot withstand large forces without becoming dislodged.

WO98/16353 discloses an apparatus for mounting a drill onto a pipe, in which a frame is clamped on the pipe, and a drill press is adjustably mounted on the platform. The drill press stand can be adjusted relative to the platform, in a direction parallel to the axis of the pipe to be drilled, and the pipe may be drilled radially. By allowing the drill press stand to be adjusted relative to the platform, a more flexible arrangement is possible. One embodiment involves using a clamp which fits around the pipe, constructed from a front plate and a back plate held together by a series of screws. In a second embodiment, the clamping means is an inverted V-shape frame which sits on top of the pipe, and is connected at both sides to a chain which loops around the pipe. The chain can be tightened against the frame to fix the clamp in position. This is done by means of adjustable tension units which are fixed to the frame, and have chain holding hooks. The hooks can raised or lowered relative to the frame, to tighten or loosen the chain.

The frame with the chain in WO98/16353 is more suitable than a simple rigid clamp for use in restricted space, due to the flexibility and relatively small volume of the chain. However, it is not readily suited for drilling into pipes of very large diameter. One problem is that the tension units pull the chain tight in a direction perpendicular to the platform. This works well for small pipes where the diameter of the pipe is not much larger than the width of the platform. However, for large pipes with diameter much larger than the width of the platform, the part of the chain which attaches to the tension units lies almost parallel to the surface of the pipe. Thus when the hook in the tension unit is raised to tighten the chain, it mainly has the effect of lifting up the end of the chain, rather than tightening it, and the amount by which the chain can be tightened is very small.

A second problem is that for large pipes, only a small part of the circumference of the pipe is encompassed within the inverted V shape of the platform. The platform is therefore likely to slip or become dislodged after it has been positioned. The chain would be unlikely to clamp tightly enough with such an arrangement, which would be a particular problem for a large pipe made from a hard material, such as a steel pipe of 70 cm diameter or more which had to have large holes drilled in situ. The chain might jump off the hook during drilling.

Although these problems might be eliminated by simply scaling the whole clamp to a very much larger size, the apparatus would then be unsuitable for smaller pipes, and extremely unwieldy.

One aspect of my invention provides system of extension plates for mounting a frame to a pipe, to carry a drill stand.

There is increasing use of large diameter structured wall popes which have a corrugated outer surface. Although these popes are double skinned, many local bye laws prohibit penetration of the outer skin. This, coupled with the difficulty of excavating around a large diameter pipe poses a particular problem.

Thus another aspect of my invention provides a clamp member which will grip the walls of corrugations on the pipe surface, to hold the frame in place on the pipe surface.

One aspect of my invention provides an apparatus for mounting a drill stand on a pipe having a circumferentially extending groove or grooves in an outer surface of the pipe. The apparatus may comprise a platform for the drill stand, the platform having a pair of support members which, in use, are presented to the pipe and define between them an angle. A clamp having a pair of clamp members which, in use, extend into the or a respective groove may be provided, and means for urging the clamp members against walls of the groove(s), thereby gripping the pipe, may also be provided The clamp members may be pivotally mounted on the platform to pivot about an axis generally transverse to the pipe axis. The clamp members, in use, may be orientable along a radius of the pipe.

A threaded member or a cam may be provided to bias a clamp member against a groove wall.

In another aspect of my invention I provide a detachable extension apparatus for a frame for mounting a drill on a pipe. The frame may have a recess for receiving pipes of different size. A pipe on which the drill is to be mounted partially sits within said recess and the frame is attached to the pipe. The extension apparatus is attachable to the frame to increase the size of the recess, for attaching the frame to larger size pipes.

The frame may comprise a V shape member, and the recess is formed between the arms of the V shape. The extension apparatus may increase the length of the arms of the V shape member.

In another aspect of my invention I provide an apparatus for mounting a drill on a pipe, the apparatus for mounting the drill comprising a platform which includes a V-shaped member which abuts a pipe to be drilled; means for attaching the platform to a pipe to be drilled; and means for mounting a drill stand on the platform, wherein the means for mounting the drill press stand on the platform allows the position of the drill press stand to be adjusted relative to the platform, and characterised in that the relative adjustment between the drill press stand and the platform is in a direction parallel to the axis of the pipe to be drilled, whereby the pipe may be drilled radially, and apparatus is provided for increasing the capacity of the V shaped member.

The apparatus may extend around only a part of the pipe circumference, and be removably fixed to the pipe by fixing means which penetrate the surface of the pipe.

I also provide apparatus for mounting a drill stand on a pipe, the apparatus comprising a frame which rests on the outer surface of the pipe, and an axial extension member extending from the frame, axially of the pipe, to inhibit rocking of the frame on the pipe.

Other aspects and preferred features of the invention are set forth in the accompanying claims.

The present invention will now be described, by way of example only, and with reference to the accompanying drawings, in which.

FIG. 7a shows a plate for forming a tension unit for the second embodiment of the invention, prior to folding of the plate, FIGS. 7b and 7c show plan and side views of a cylindrical section of the tension unit, FIGS. 7d and 7e show a cross-section and a plan view of a top cover of the tension unit, FIG. 7f shows box section of the tension unit, FIGS. 7g and 7h show plan and side views of a movable nut of the tension unit.

FIG. 8a shows the movable nut of FIG. 7h with a hook attached thereto, FIG. 8b shows a side view of the nut of FIG. 8b and FIG. 8c shows the hook of FIGS. 8a and 8b.

Figure 9:
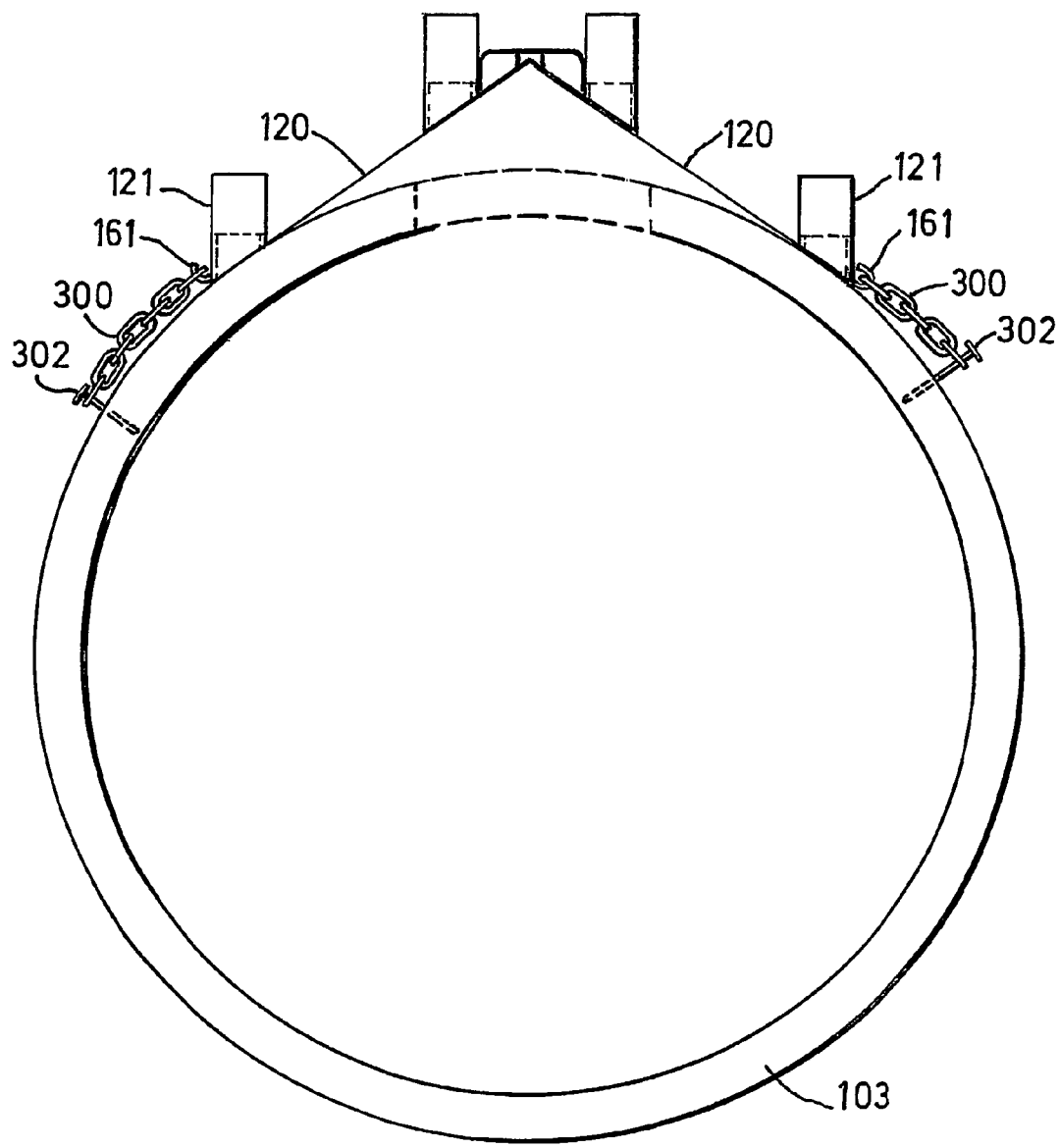

FIG. 9 shows a third embodiment of the invention, in which the single chain is replaced by two short lengths, which are bolted to the pipe.

Figure 10:
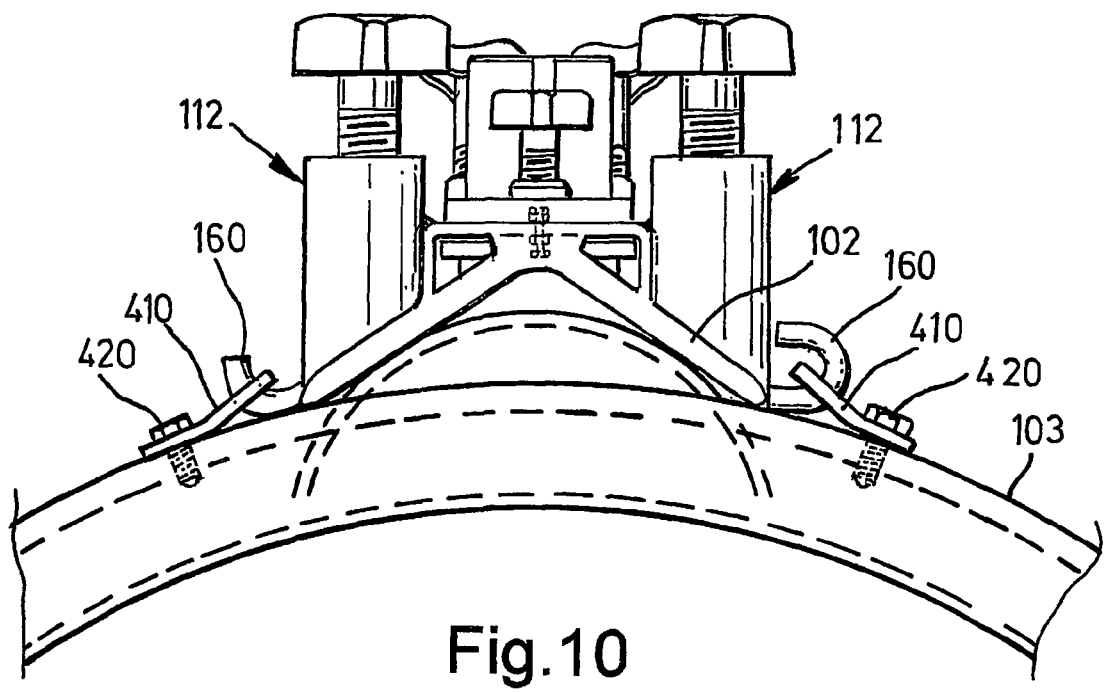

FIG. 10 shows a fourth embodiment, in which two clips are used in place of chain, to bolt the clamp to the pipe.

Figure 11:
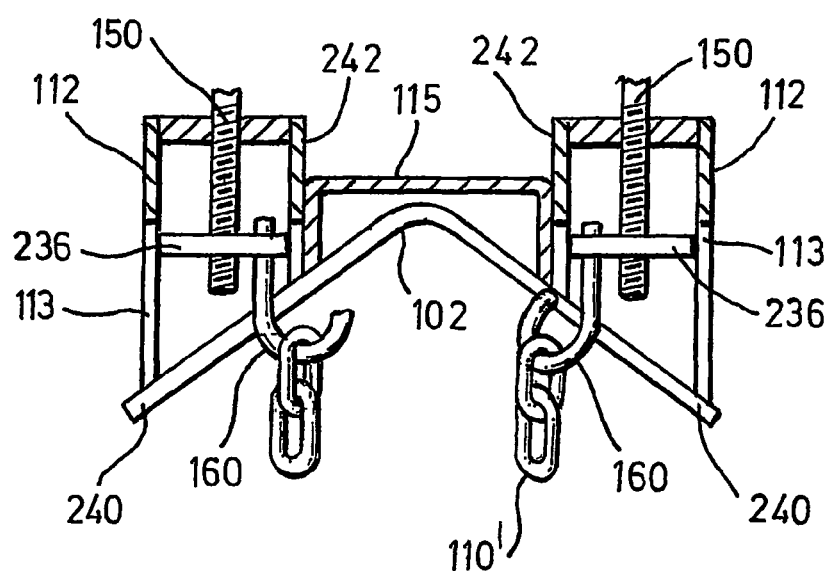

FIG. 11 illustrates a further modification in which the chain holding hooks can extend through gaps in the frame, to allow smaller diameter pipes to be clamped.

Figure 3:
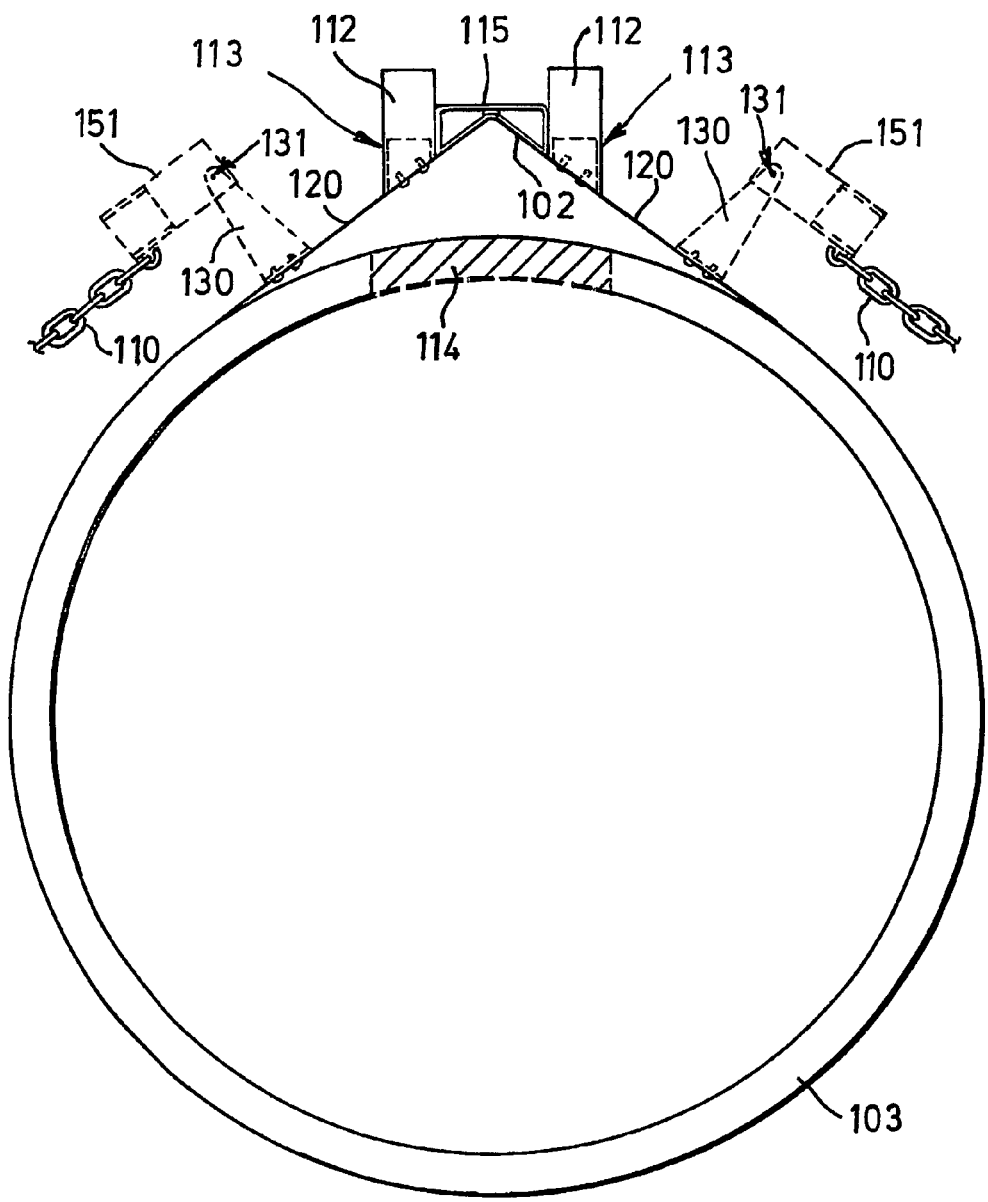
FIG. 3 shows a second embodiment of the invention.
Figure 4:
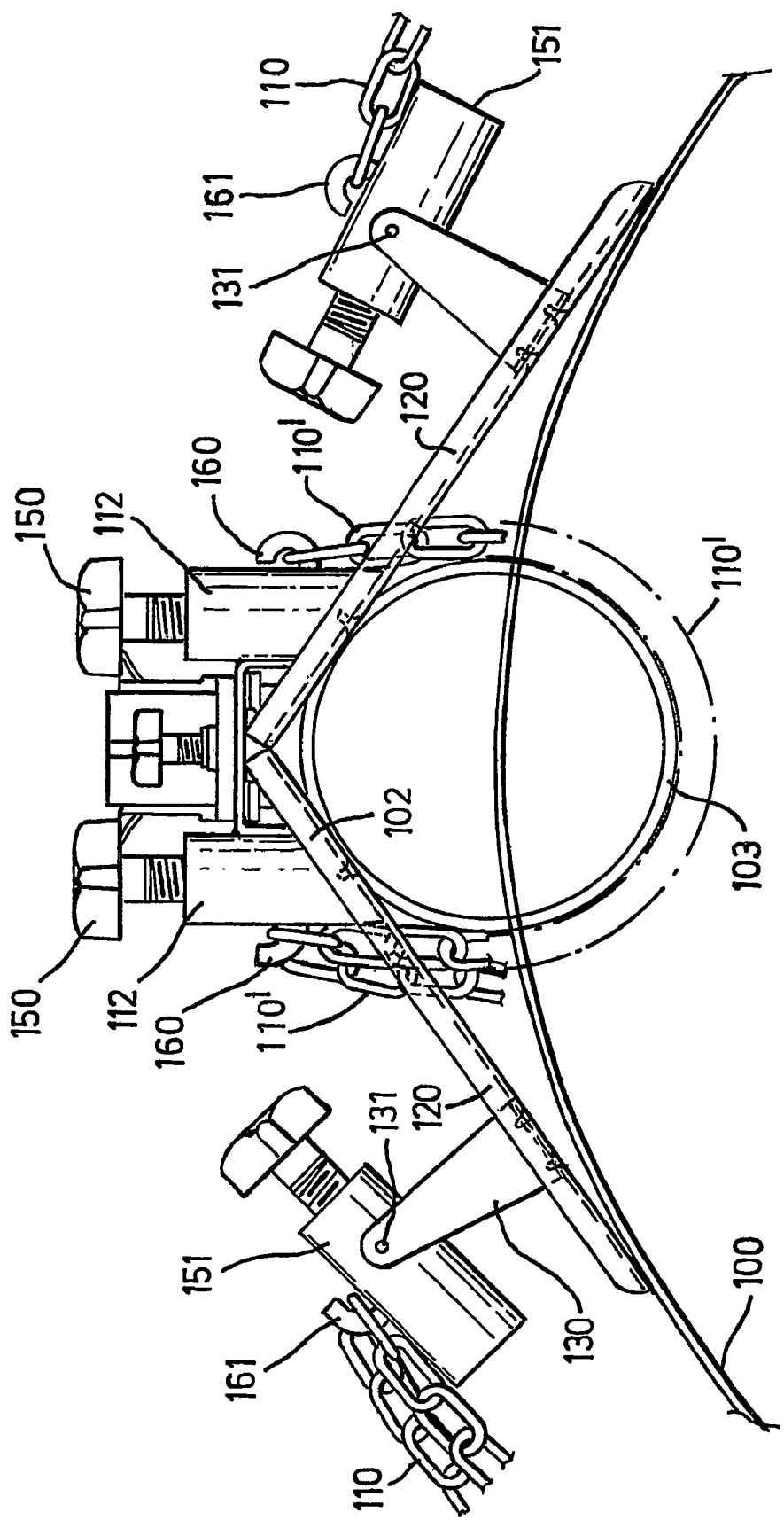
FIG. 4 shows a close up side view of the clamp of the second embodiment of the invention.
Figure 5:
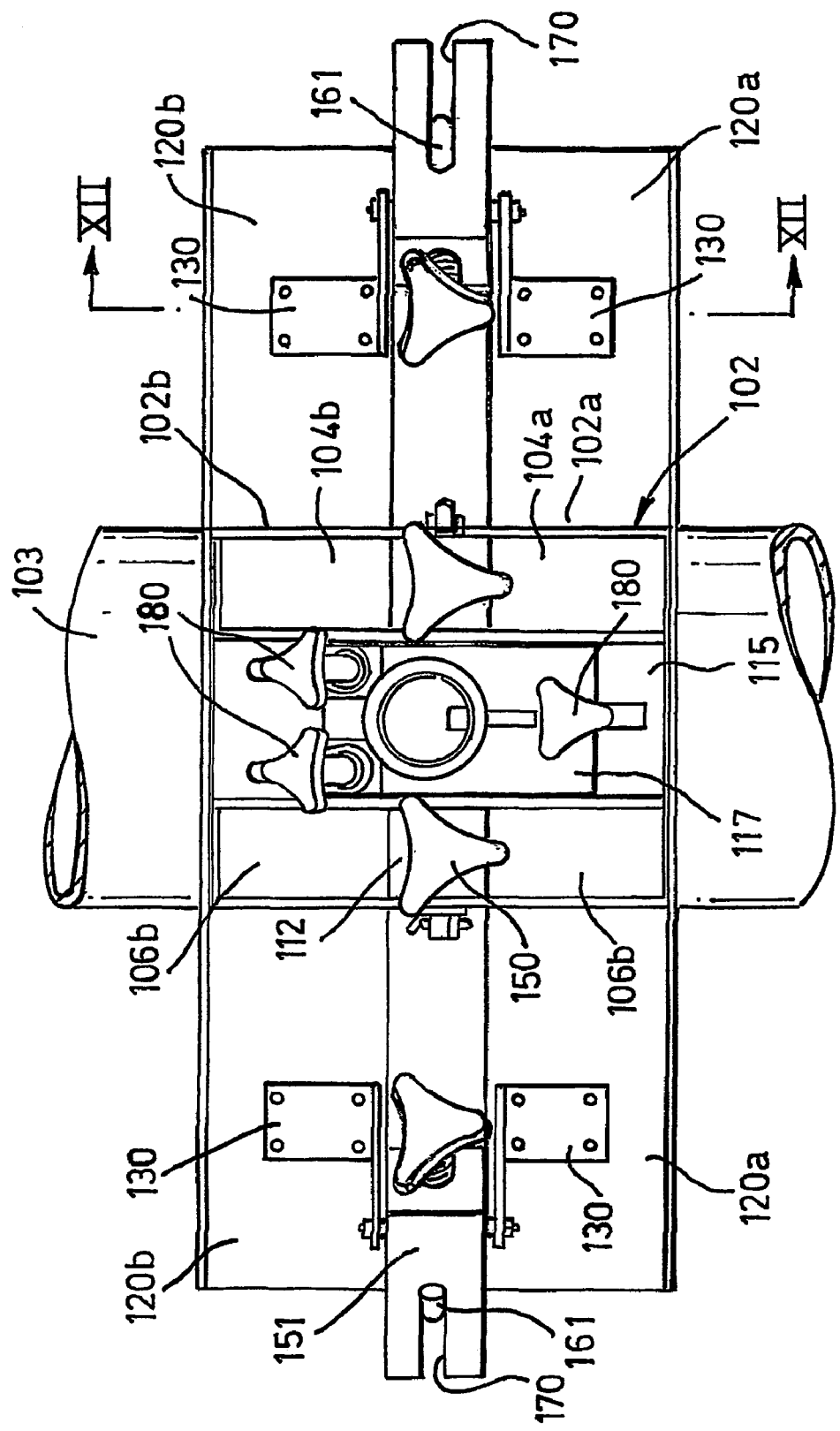
FIG. 5 shows a top view of the clamp of the second embodiment of the invention.
Figure 14:
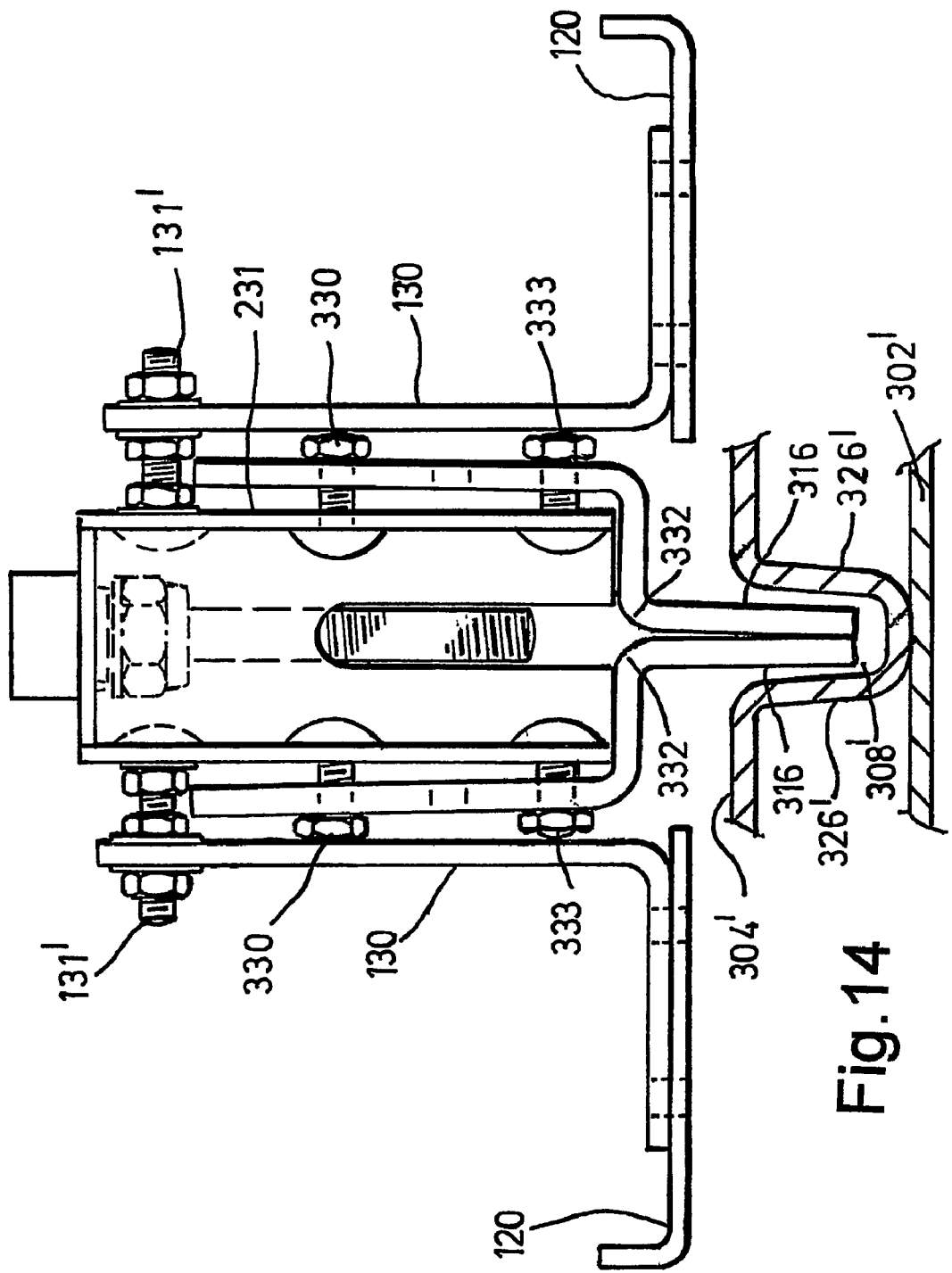
Figure 15:
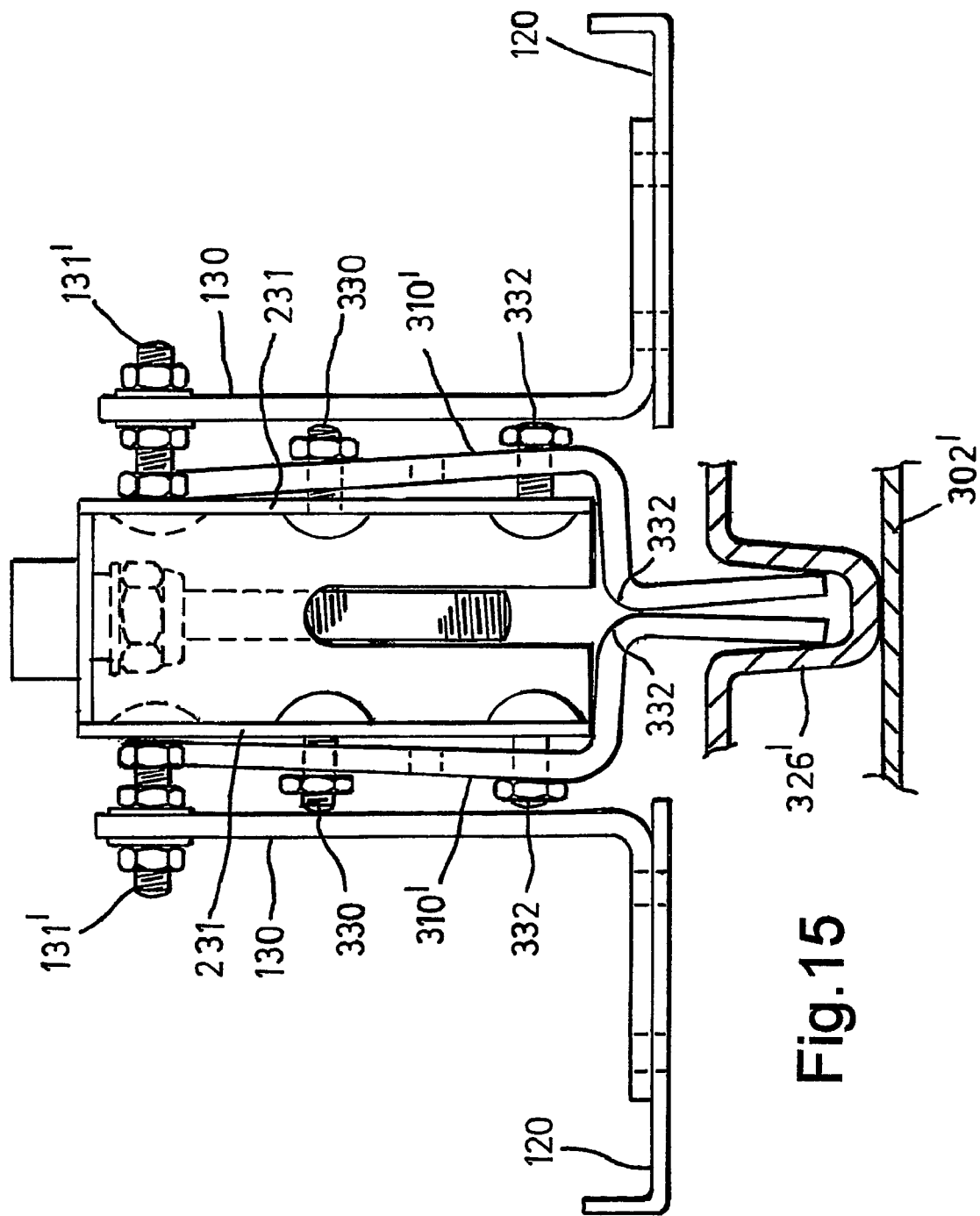
Figure 18:
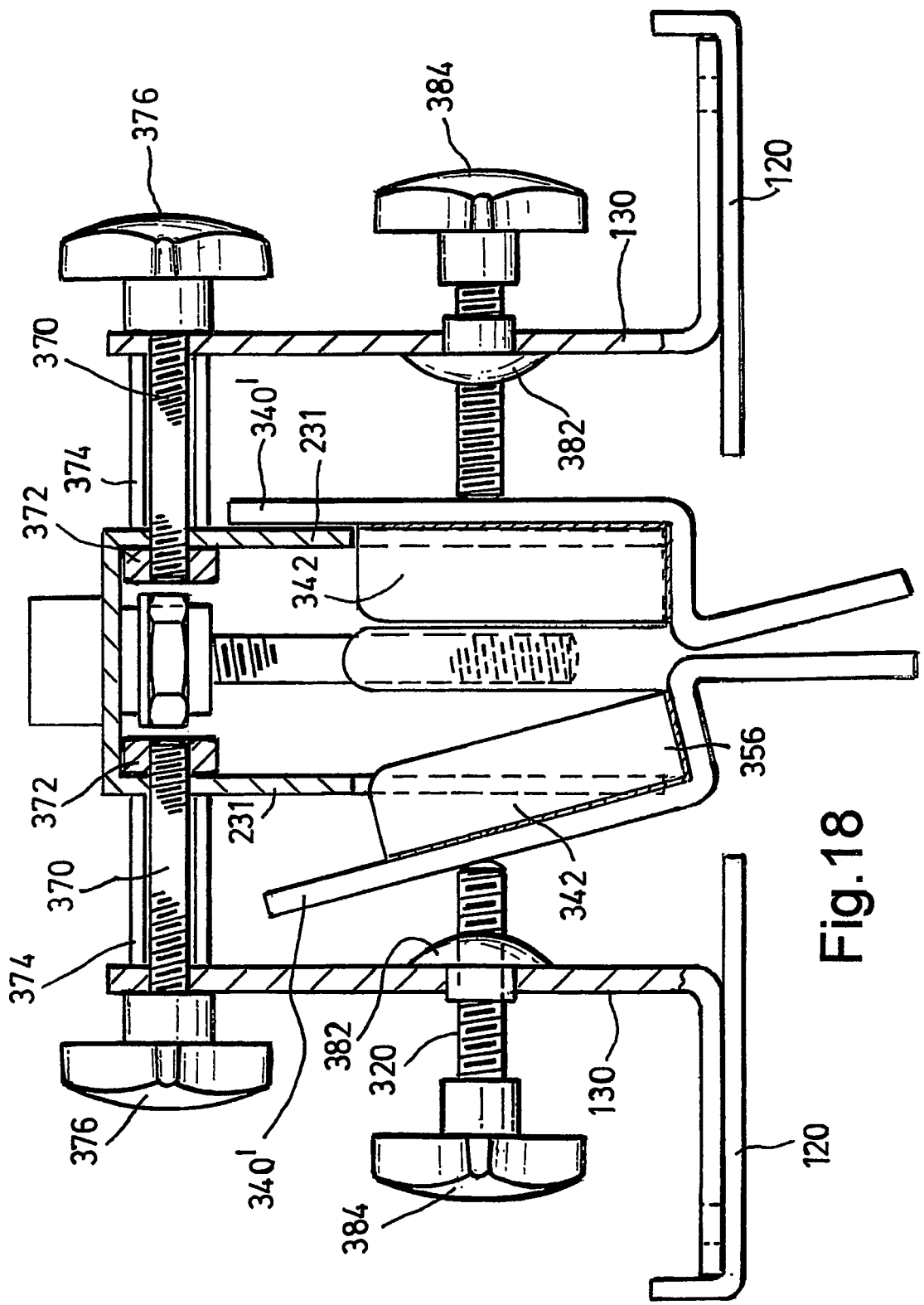
Figure 19:
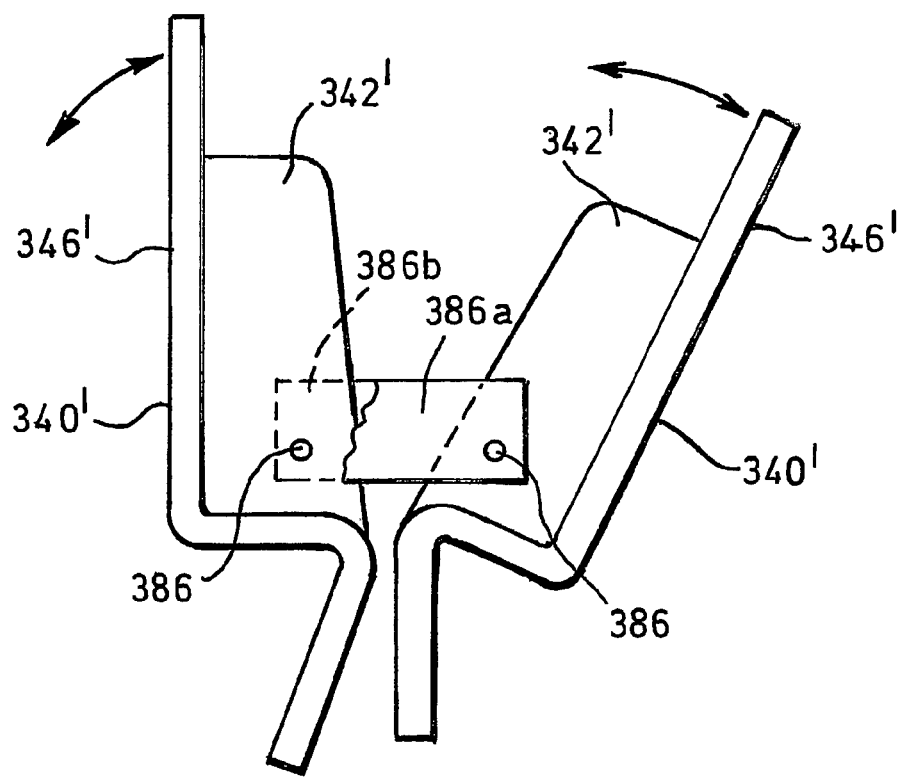
Figure 22:
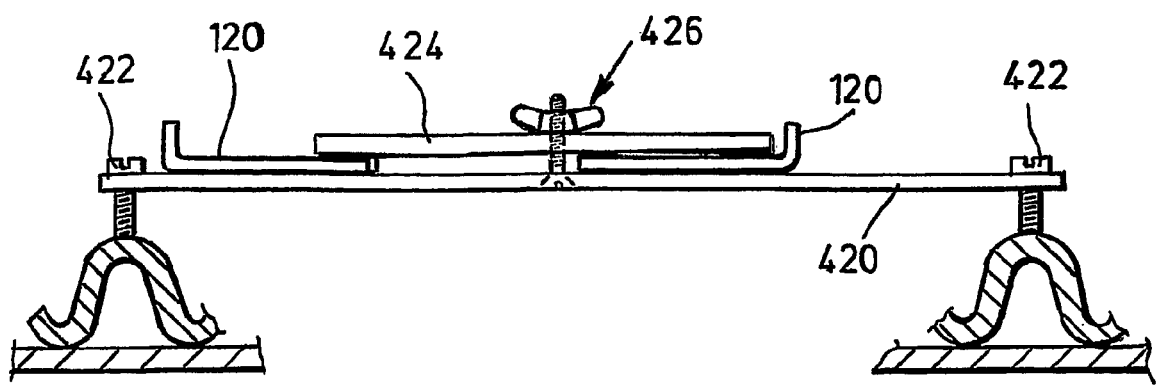
Figure 21:
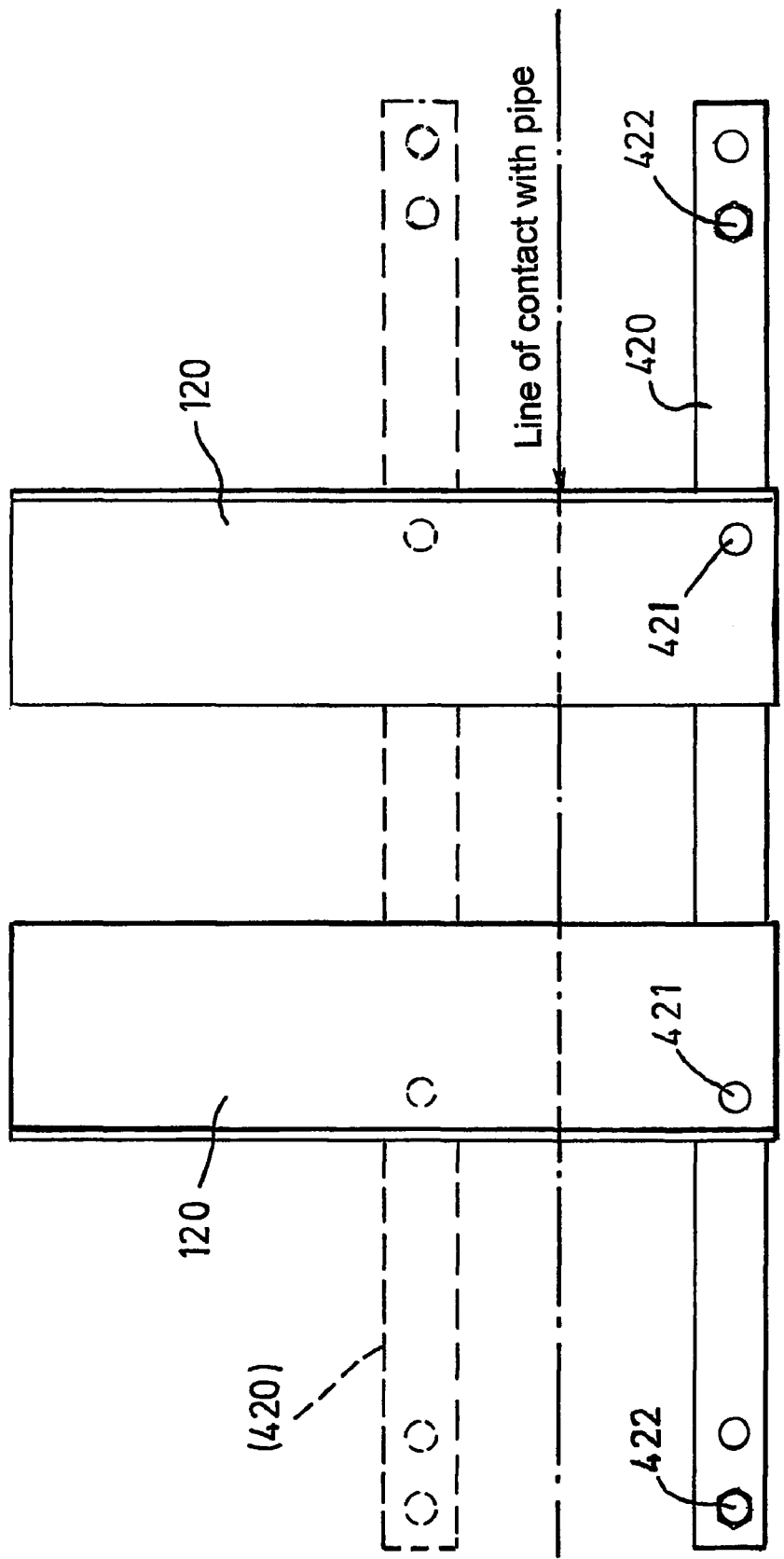

FIG. 12 shows a modification of the embodiments of FIGS. 2 to 11, using a clamping device of the invention, taken along line XII-XII of FIG. 5, FIG. 13 is a perspective view of a clamping member, FIG. 14 is a view similar to FIG. 12, showing another arrangement for a clamping member, FIG. 15 shows the arrangement of FIG. 14, in a clamping condition, FIG. 16 shows another embodiment of the clamping device, partially cut away, FIG. 17 shows a perspective view of another clamping member, FIG. 18 shows a side view of an embodiment of the clamping device with threaded studs, FIG. 19 shows a side view of another embodiment, partially cut away, FIGS. 21 and 22 show systems for stabilising the frame on a pipe.

Figure 23A:
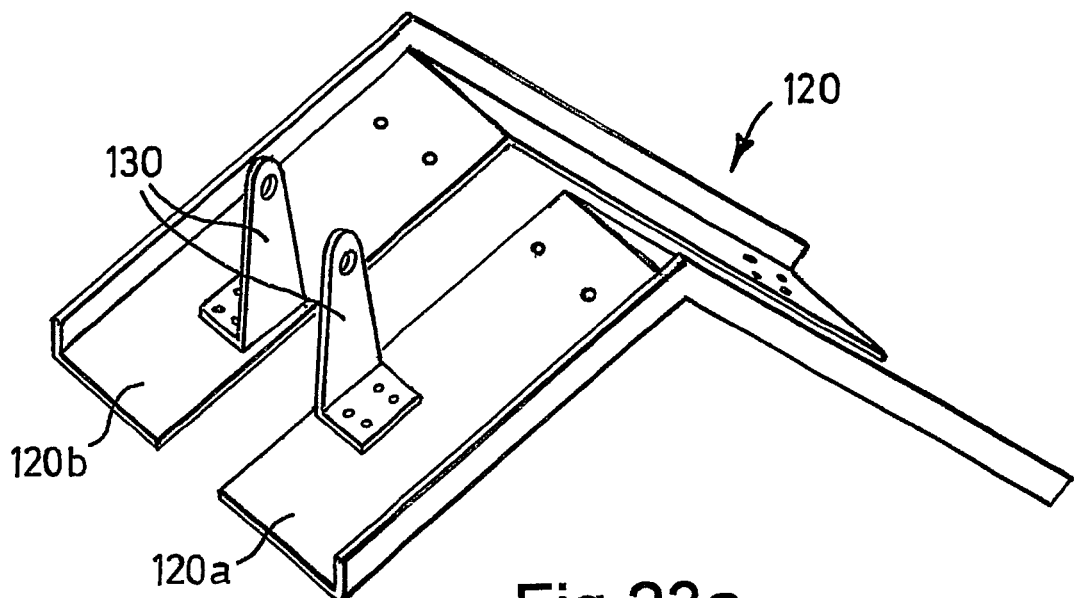
Figure 23B:
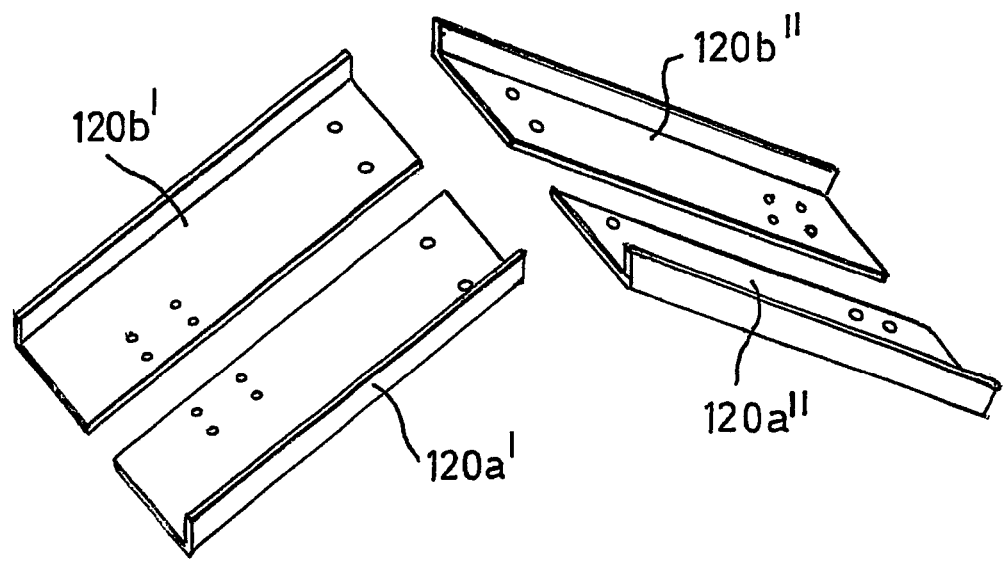

FIGS. 23a and 23b show different embodiments of the extension plates.

Figure 1A:
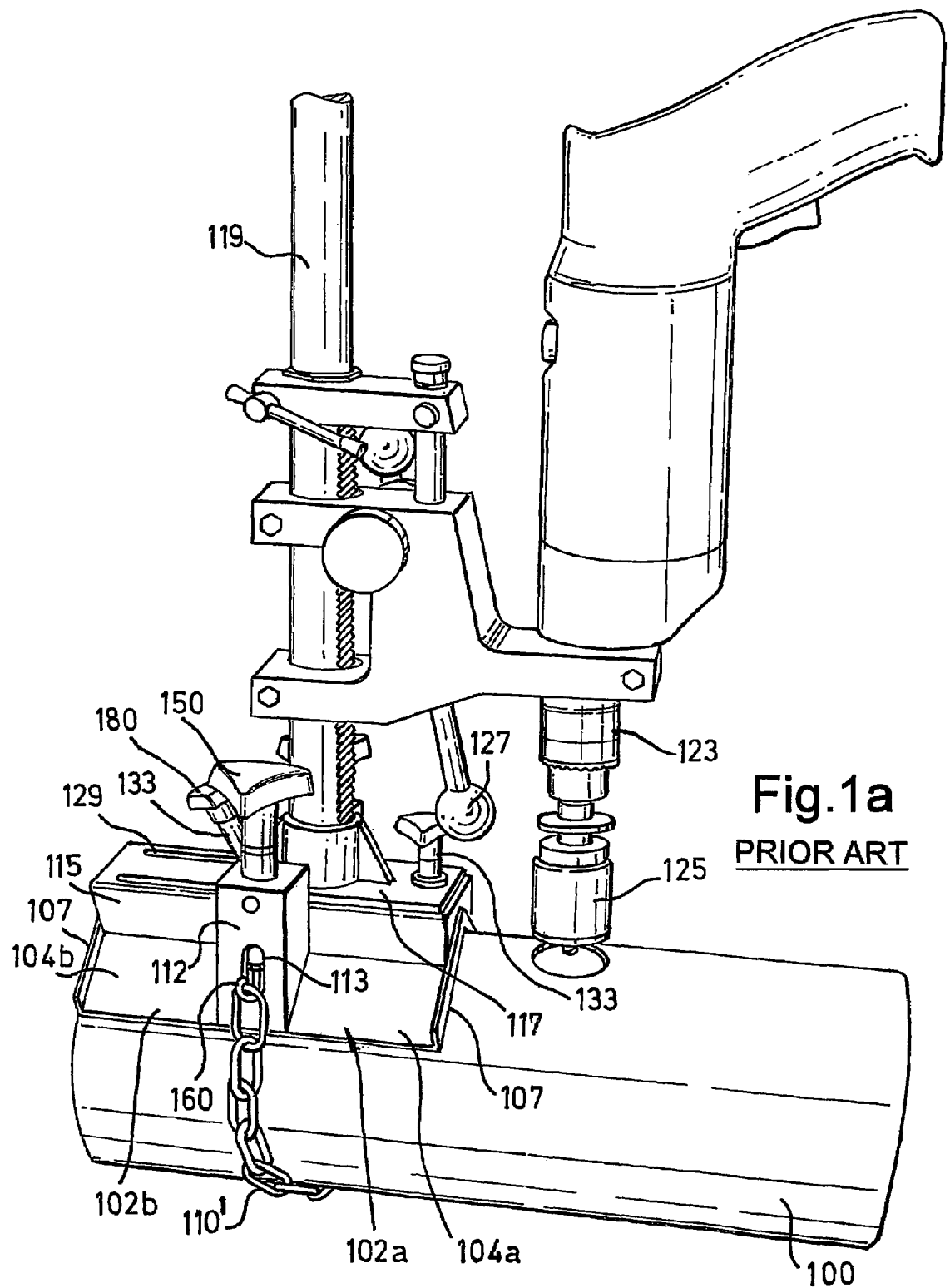
FIG. 1a shows a prior art apparatus for mounting a drill stand on a pipe.

FIG. 1a shows a prior art clamp unit of the type seen in W098/16353 fitted to a pipe 100 of moderately large diameter. The clamp unit comprises an inverted V-shape frame 102 which is two halves 102a, 102b, which is placed against the pipe 100. A chain 110, formed from a plurality of metal links loops around the pipe. The chain 110 is pulled tight to clamp the frame on the pipe 100. The chain 110 connects to the frame 102 by means of two tension units 112, one of which bridges between the respective arms 104a, 104b and 106a, 106b of the frame halves 102a, 102b (see FIG. 5). Each tension unit 112 engages the chain 110 by means of a movable hook 160. The hook 160 can be moved towards the surface of the pipe 100, to loosen the chain, or moved away from the surface of the pipe, to tighten the chain. The particular chain link which engages with the hook may be selected according to the size of the pipe. The hook protrudes through a slot in the side of each tension unit 112, and the top 113 of the slot limits adjustment of the chain 110. A platform 115 for a drill stand is mounted on top of the frame 102. The drill press stand is mounted onto the platform, and it can be adjusted in position relative to the platform in a direction parallel to the axis of the pipe. The pipe may be drilled radially.

The frame halves 102a, 102b, housings of the tension units 112 and the platform 115 are welded together.

As described more fully in W098/16353, which is incorporated herein by reference, the V-shape frame 102 may be formed to have side flanges 107 which provide extra strength for it. The V-shape frame 102 may be formed integrally with the platform 115. A casting 117 receives a pillar 119 of a drill press stand. A drill, including a chuck 123 and a borer 125 mounted in the chuck, may be mounted on the drill press stand. It will be understood that by rotation of the drill press stand handle 127, the drill may be advanced towards or away from the pipe. In this way therefore the borer 125 may be brought selectively into contact with the pipe.

The casting 117 is mounted onto the frame 102 by means of elongate mounting holes 129 formed in the platform 115 and corresponding mounting holes formed in the casting 117. Bolts 133 pass through the holes in order to rigidly clamp (via nuts) the casting 117 to the frame 115. This allows the accurate alignment of the drill to be used with the pipe. The bolts are adjustable by rotatable handwheels 180.

Each side portion 104, 106 of the frame 102 carries a tension unit 112. Each tension unit comprises a turret, within which is housed a screw-threaded member which may be rotated manually by a rotatable handwheel 150. Rotation of the handwheels causes the screw thread to rotate and thereby selectively move a detent up or down, in this example the detent being a metal hook 160. The ends of the chain 110' may be placed over the hooks 160 of the tension units 112, and thereby the tension in the chain may be adjusted for clamping the frame 102 to the pipe. It will be apparent that only one of the hooks 160 needs to be adjustable.

When the drilling operation has been finished and it is desired to remove the frame 102 from the pipe then this is simply a matter of the user releasing the tension in the chain sufficiently for the chain to be removed from a hook 160.

Figure 1B:
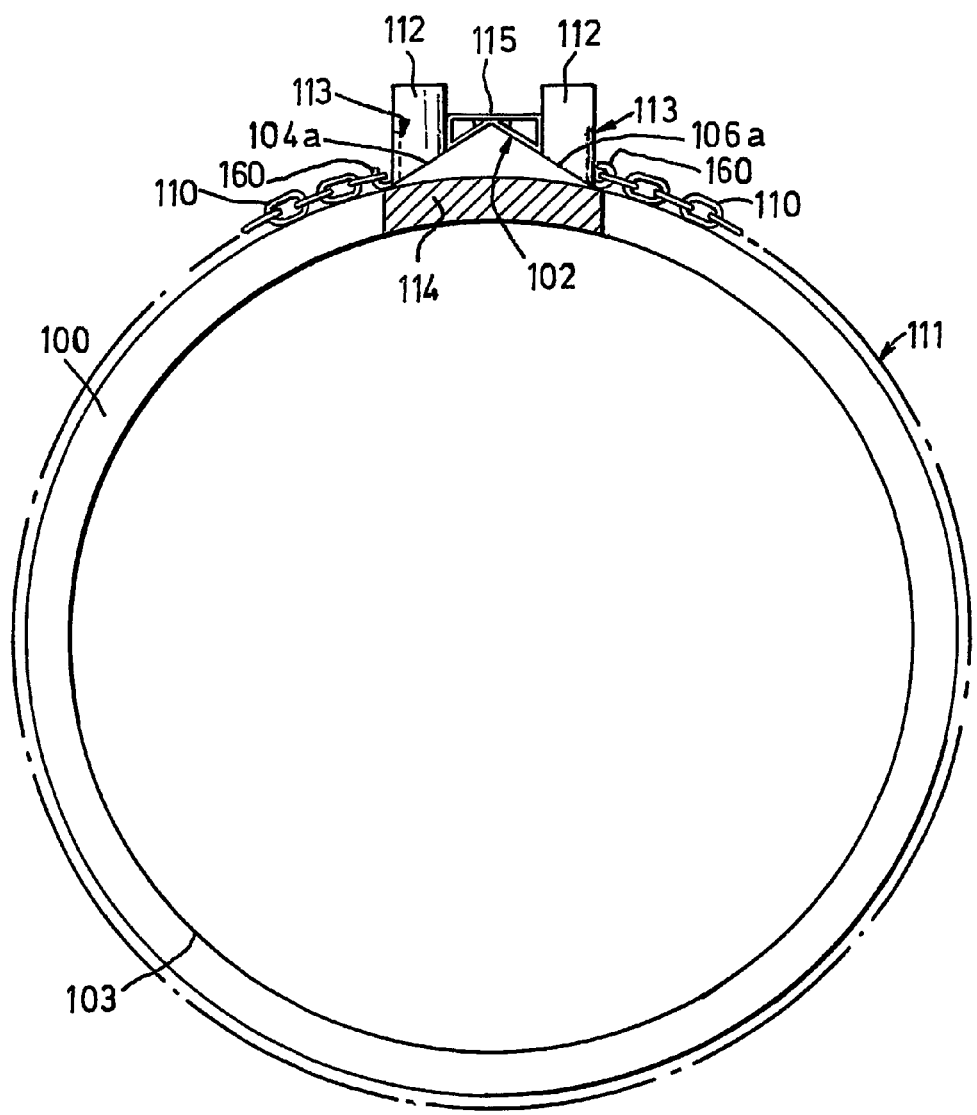
FIG. 1b shows a cross sectional view through a larger diameter pipe with the frame of FIG. 1a mounted on it.

However, this arrangement for mounting the frame 102 on the pipe has been found to work well only for a pipe of small diameter. As seen in FIG. 1b, for a pipe of large diameter, the chain meets the tension unit almost horizontally, so if the position of the hook 160 is adjusted to attempt to tighten the chain, it tends to simply lift the end of the chain off the surface of the pipe, which does not sufficiently tighten the chain. Also, the frame 102 is likely to slip, as the inverted V-shape frame lies against an almost flat region of the pipe surface and there is little force pulling the frame onto the pipe surface.

Figure 2:
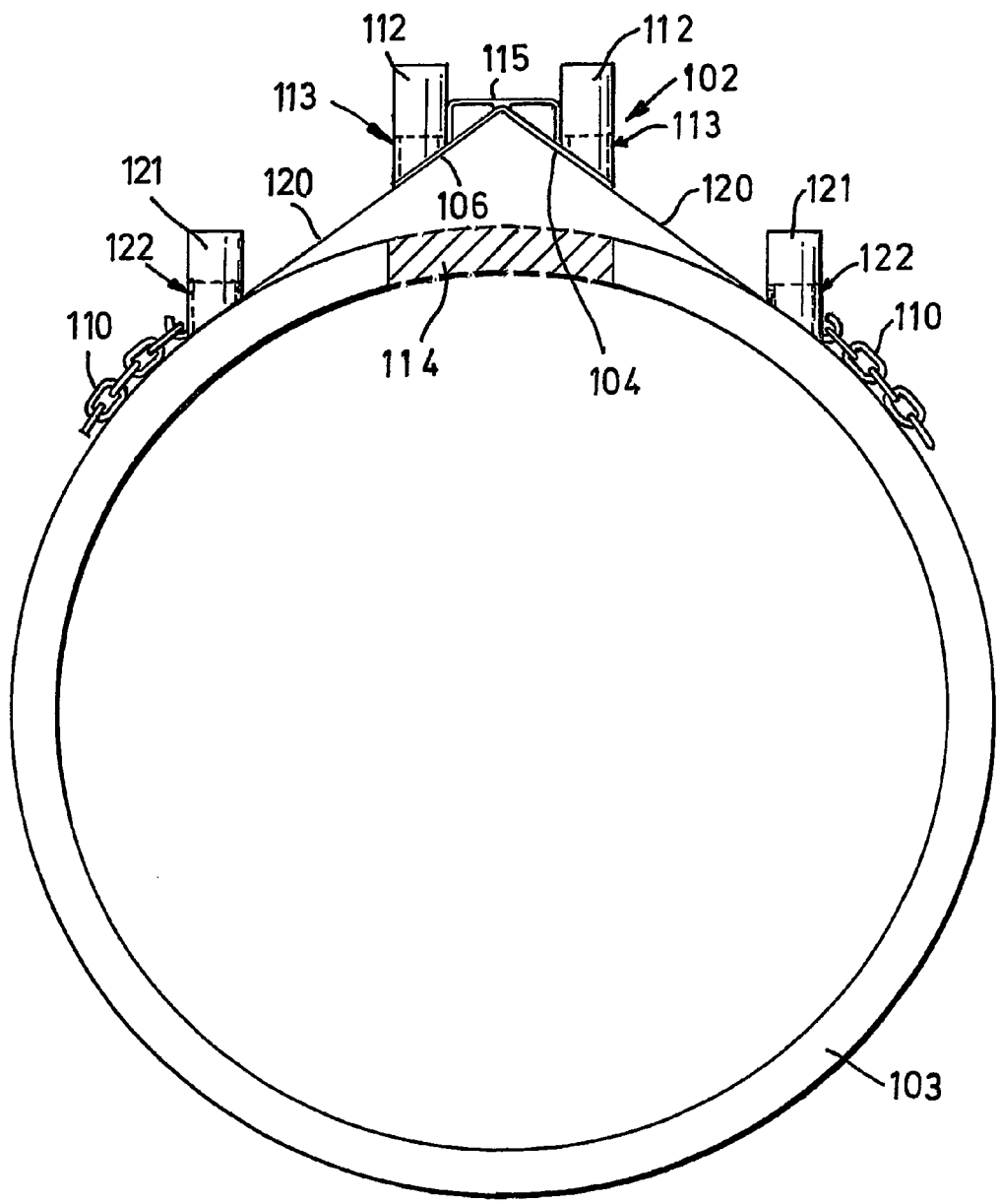
FIG. 2 shows a first embodiment of the invention.

FIG. 2 shows a first embodiment of the invention. A frame 102, identical to that of the prior art of FIG. 1, has V-shaped extension plates 120 in the form of two halves 120a, 120b attached (see FIG. 5), one to each half 102a, 102b of the frame 102. When the extension plates are attached to the frame 102, they extend the size of the V-shape of the frame 102. The extension plates may be attached by means of countersunk screws. Additional tension units 121 are provided, bridging the plate halves 120a, 120b to form an integral unit with the plate halves. The tension units 121 on the extension plates may now be used instead of the units 112 which are located on the frame 102. This arrangement greatly increases the portion of the pipe circumference which is held inside the (enlarged) V-shape frame 102, 120 and also increases the angle at which the chain meets the tension units. Both of these effects reduce the chance of the chain 110 not tightening properly, and the frame 102 120 slipping during the drilling process.

The extension plate 120 is removable, so that when the clamp is used with a large pipe, the extension plate 120 will be fitted, but when the clamp is used with a small pipe, the extension plate 120 will be removed. The plates have an upturned flange at one edge to provide greater rigidity.

A range of extension plates 120 may be provided to give different extension lengths, thus allowing the frame to be extended to a choice of sizes, rather than to a single extended size. This may be useful where the apparatus is used with a mixture of small, medium and large pipes. It may be desirable to have extension plates permanently attached to the V-shape frame. A single pair of tension units might be provided, located on the end of the extension plates, with no tension units on the non-extendable part of the frame.

It will be appreciated that in place of a V-shaped plate, two flat plates may be provided, attached to a respective arm of the frame half 102a, 102b, although this may require a much stronger connection to the frame 102 and may be more likely to flex.

FIG. 3 shows a second embodiment of the invention. The clamp is identical to the clamp of FIG. 2, except that in place of tension units 121 a second pair of tension units 151 is now fastened to the extension plates 120 by means of pairs of brackets 130. The tension unit 151 may pivot around an axis 131, thus allowing the angle at which the tension unit 151 aligns with the chain 110 to self-adjust so that a tensioning screw inside the tension unit is 151 aligned with the end of the chain 110.

FIG. 4 shows a larger scale side view of a clamp unit according to the invention. The use of the unit with both a large pipe 103, and with a small pipe 100, is illustrated. For the small pipe 100, the extension plates 120 are unnecessary, and the chain is looped onto hooks 160 in the first pair of tension units 112. When the handwheel 150 is turned in one direction, the end of the chain is pulled upwards, and the chain tightens around the pipe 100. For use with the large pipe 103, the chain is looped onto the hooks 161 in the second pair of tension units 151. As mentioned above, these tension units may pivot about an axis 131 which runs parallel to the axis of the pipe. They will therefore self-compensate for any change in chain direction due to a larger pipe diameter.

Comparing FIG. 3 with FIG. 4, it can be seen that the tension unit 151 may be reversible, such that it can be removed and re-attached to face the hook 161 towards or away from the pipe 103. Alternatively, the tension unit may have two slits 170 (FIG. 5), which are on opposite faces, rather than a single slit. The hook 161 maybe positioned in either slit.

FIG. 5 shows a top view, corresponding to the side view shown in FIG. 4. The brackets 130 for the second pair of tension units 151 are attached to the extension plates 120 by screws. The tension unit is pivotally suspended between a pair of brackets 130.

As described above, handwheels 180, may be used to loosen the bolts 133 holding the casting 117 on the platform 115. The position of the drill relative to the frame 102 may then be adjusted, and once in the correct position, the handwheels 180 used to tighten the bolts again.

Figure 6A:
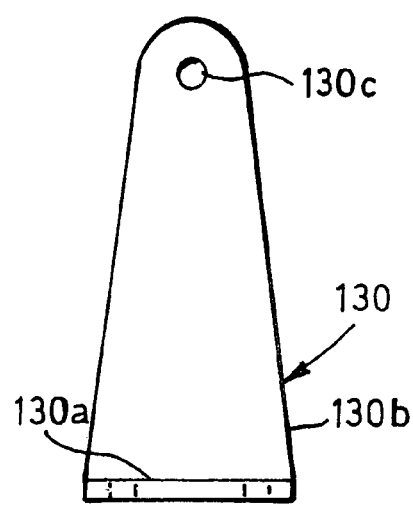
FIG. 6a shows a front view of a bracket for suspending a tension unit of the second embodiment of the invention.
Figure 6B:
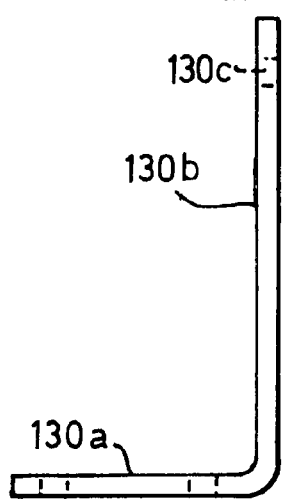
FIG. 6b shows a side view of the bracket and FIG. 6c shows a top view of the bracket.
Figure 6C:
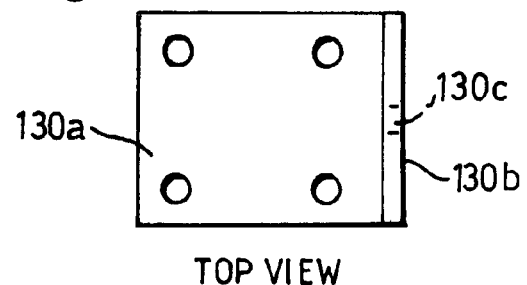

FIGS. 6a through 6c show the construction of the brackets 130 for pivotally mounting the second pair of tension units 151. Each bracket has a base 130a with four bolt holes, and an upright section 130b, perpendicular to the base, with a hole 130c for the fulcrum of the tension unit. The brackets are mounted on the extension arms 120 of the V-shape frame in pairs. The fulcrum of a tension unit 151 is suspended between each pair of brackets. The brackets are mounted by countersunk screws set into the extension plates 120 from underneath so that the screws do not foul the pipe when drilling. Referring to FIGS. 7a through 7h, a tension unit 151 unit is formed from two folded flat plates 229. Each plate folds along axis 230 and the two plates 229 are welded together to form a box section 231. A top cover 232 is welded into the box section 231 in order to ensure that the box section will maintain a square cross section. The top cover has a central hole 234, in which a cylindrical section 235 is inserted and welded in place. This cylindrical section 235 provides an anchor for attachment of a central threaded column. A movable hook nut 236 (see also FIG. 8a) is mounted onto the central column, via a tapped hole 237. This hook nut acts as a movable platform, and has a second tapped hole 238, which accommodates a hook 161 for holding the chain.

FIGS. 8a through 8c show the hook 161 attached to the movable platform 236, and held in place by a lock nut 239. The hook 161 has a threaded end, which screws into the tapped hole. The shape of the hook can be chosen according to the size and shape of the pipe, e.g. the hook can be "U" shape (FIG. 8c) or "P" shape (FIG. 8b). A "P" shape hook is used to prevent loss of the chain. It is preferable to have a 'P' (closed) hook 161a meeting one end of the chain, and a 'U' (open) hook meeting the other end of the chain.

The whole extension unit comprising the extension plates 120 and the tension units 121, or 151, can be unbolted from the original tool for use with normal sized pipes, to reduce weight and be more compact.

For pipes of very large diameter, for example 2 meters or more, it may be inconvenient to fasten a chain all the way around the pipe because of the difficulty of excavating to a depth below the pipe. An alternative embodiment of the invention provides two separate short lengths of chain 300 or flat linkage, instead of one single long chain. One end of each short length 300 is dropped over the hook 161 and the other end is attached direct to the pipe by a screw or stud 302, for example by a spring-loaded butterfly-type or similar fitting used on hollow structures. Another alternative is to supply a large self-tapping screw for each short link that would be sufficient for the double skinned pipes by drilling through the outer skin only, in jurisdictions where this is allowable, so that there would not be any problem of leakage. The hole could be plugged to prevent soil from entering the space between the two skins if necessary.

For large underground pipes it would probably be advisable to drill and tap through the pipe, and if the wall thickness is sufficient, to drill and tap a blind hole, so that there would not be a problem of leakage. With large concrete pipes, for example two meters in diameter, drilling and using expanding bolts would be possible.

FIG. 10 shows a frame 102 according to the invention, which is clipped to the surface of the pipe, instead of being held in place by a chain. The frame could be clipped in place either with or without the extension plates fitted. The advantage of having the extension plates fitted is that if the hole to be drilled was large, a clamp with extension plates would provide a support of larger base area for operation of the drill.

Clipping the clamp to the pipe, or using short chain lengths, rather than clamping with a chain, eliminates the need to excavate the trench beyond the full depth of the pipe to allow a chain to encompass the entire circumference of the pipe. When structured wall plastic pipes are to be drilled (vide hereinafter) it is probably sufficient to use two self tap screws into the outer skin only of the pipe, as the pressure upon the plastic pipe is so small that the two screws should be enough to hold the pipe-drilling tool securely in place while drilling. On steel pipes, it would be preferable to drill and tap the holes for the clip bolts or to use one of the various fixings used for hollow walls.

Clips 410 hold the frame 102 in place by looping over the hooks 160, and they anchor the frame 102 by means of screws 420 which are fastened into the surface layer of the pipe. The tension units 112 may be used to tighten the clips, and prevent the clamp from moving.

Referring to FIG. 11, the tension units 112 are welded across the gap between the frame halves 102a, 102b, as is the platform 115. The result is that the gap extends below the inner side of each tension unit 112, and can accommodate the hook 160. The hooks 160 are reversible in the tension units 112, to face inwardly. They extend down through the gap to receive the chain 110'. The inner face 242 of the tension unit 112 may be slotted to allow for maximum upward travel of the hooks 160. By facing the hooks 160 inwards, smaller diameter pipes may be clamped.

FIGS. 12 to 16 illustrate another modification of the embodiments of FIGS. 2 to 11, for holding the apparatus on a structured wall pipe having a corrugated outer surface. Plastic pipes having a smooth inner wall and a corrugated outer wall or skin are known. The corrugations, forming a series of ridges and grooves, run circumferentially around the pipe. In many applications, the outer skin should not be pierced, and so the arrangement of FIG. 9 or 10 would not be appropriate. With large diameter pipes set into the ground, it may not be feasible or desirable to excavate to a depth below the pipe, and so a chain or other stop, such as in FIG. 2 or 3 cannot be used.

I provide gripping or clamp members which, in use, extend into a circumferential channel of the outer skin of the pipe to grip the wall of the channel. The clamp members may urged apart to force them against opposite walls of the channel, thereby gripping the pipe. In another embodiment the clamp members extend into adjacent grooves and are urged together to grip the walls of the ridge separating the grooves. A member may be twisted about the radial axis of the pipe, so as to engage opposite walls of a groove and form a wedging action, but a clamping action is preferred.

Preferably the clamp members are mounted on a tension unit 151. It is preferable that the clamp members extend as far as possible into the respective groove(s). The clamp members should preferably grip on the relatively flat region of the groove wall just above the arcuate base of the groove. Preferably they are oriented along a radius of the pipe. As seen in FIG. 4, the position of the tension member 151 relative to the contact point between the pipe outer wall and the plates 120 depends on the pipe diameter. Thus, the clamp plates are pivotally mounted with the tension unit 151, between the support brackets 130. In this way they can be oriented along the pipe radius before being tightened against the groove walls.

The dimensions of the ridges and grooves have been found to vary considerably between pipe manufactures and pipe sizes. Thus, in some cases only a relatively narrow groove is provided, with a relatively wide ridge.

In one embodiment the box section housing 231 of the tension unit 151 carries the clamp members. Clamping bolts may be used to draw the clamp members together or urge them apart to grip the groove walls. In a particularly preferred embodiment, a cam member is provided to bias the clamp member.

Other preferred features of the clamping system will be apparent from the following detailed description.

FIG. 12 is a view taken generally on line XII-XII of FIG. 5 and showing a modification to incorporate a clamp of this invention. Referring to FIG. 12, the brackets 130 have been positioned further apart as compared to the FIG. 5 embodiment, for reasons which will become clear hereinafter. In FIG. 12, the pipe clamping apparatus is mounted on a double skinned plastics pipe 300 which has a cylindrical inner wall or skin 302 and a corrugated outer skin 304. Such pipes are well known in the art. Outer skin 304 has ridges 306 separated by grooves 308. As noted above, the extension plates 120 (which in another embodiment could be an integral part of the V-shaped frame 102) are likely to be spaced from the outer skin 306 at the region of the brackets 130.

The box section 231 of the tension unit 151 pivots on axles 131' (here provided by nut and bolt arrangements) between the brackets 130. The hook nut 236 (FIG. 8) has been unthreaded from the column 244, to allow clamp members 310 to be inserted in the box section 231. Clamp members 310 are dog-legged, that is they are stepped, with have upper and lower portions 312, 316 which are space laterally by a central web or step 317. An upper portion 312 secured to the box-section 231 by a nut and bolt 314 which, when loose, can slide in a slot in the box-section wall or in the clamp member, to allow adjustment of the height of the clamp member relative to the box-section 231. Nut and bolt combinations 314 are tightened to secure the clamp members 310 to the box-section 231. The lower length 316 of each clamp member extends into a respective groove 308, thus the arrangement straddles a ridge 306. The clamp members are pulled together, to clamp onto the ridge 306, by a clamp bolt 318.

In use, the tension member 151 is swivelled clear of the brackets 130, as can be seen in FIG. 3 for example. The hook nuts 236 are removed and the clamp members positioned in the box section. The tension member 151 is then swivelled back until the box section 231 and the clamp members 310 are aligned with a radius of the pipe 300.

A clip, not shown, may be provided to hold the clamp members in place temporarily, while the tension member is swivelled to move the clamp members into the groove(s).

The nut and bolt combinations 314 and the clamping bolt 318 can then be tightened to grip the ridge 306, and secure the clamp members 310 to the box-section 231. The clamp members extend as deeply as possible into the grooves 308, but preferably will remain clear of the curved wall section at the bottom of the groove. It will be appreciated that when clamping to a different width ridge 306, the clamp member upper portion 312 will not necessarily lay flat against the walls of the box section 231. All that is required is to achieve sufficient grip between the respective parts.

Referring to FIG. 13, the clamp member 310 is of spring steel to provide some resilience for enhanced grip. A slot 320 is shown for the bolt 314. However, it is presently preferred that the slot by provided in the wall 322, 324 of the box section 231.

For greater width between the lower portions 316 of the clamp member 310, the clamp members may be positioned outside of the box section (cf FIG. 14).

The lower portions 316 are preferably roughened or have a rough surface applied to them to enhance the grip on the ridge 306.

There is a tendency for the clamp members 310 to ride up the ridge walls 326 when clamp bolt 318 is tightened, and so weight may be applied to the apparatus during tightening to resist movement away from the pipe.

The hook nuts 236 may be left in the box sections 231, and can be screwed down on to the top of the clamp members 310 to urge them into the groove 308. It will be appreciated that the groove walls tend to be sloped to form a V shape, and so the clamp members may tend to ride up the groove walls as the clamp is tightened, which will raise the frame 102 or extension plates 120 clear of the pipe surface. Hence a weight, such as an operative leaning on apparatus, may be applied while tightening the clamp. Even if the frame 102 or plates 120 are lifted clear of the pipe surface, sufficient rigidity may be obtained to allow drilling of the relatively soft plastic pipe wall.

Referring to FIG. 14, this shows firstly an arrangement with the clamp members positioned outside the box section 231. Secondly, the clamp members are arranged with their lower clamping portions 316 abutted, so as to fit within a groove 308' of the pipe outer skin 304'. The upper clamping bolts 330 are tightened to cause the clamp members to pivot about their knees 332 where they abut (see FIG. 15). In the alternative, the clamp members will pivot about the lower edge of the side wall of the box member 231, however care must be taken to avoid distortion of the box member 231. Lower bolts 333 maintain the alignment of the clamp members 310' with the box-section 231.

As mentioned above, the distance of the plates 120 (in the region of the brackets 130) from the pipe wall depends on the pipe diameter. Also the dimension of the pipe ridges 306 and grooves 308 varies from pipe to pipe. Thus a range of clamp members 310 of different length may be provided. To reduce or avoid the need for a range of clamp members, the clamp members may have a number of positions for mounting the bolts 314, 318 or 330, 332. Also brackets 130 may be mountable in different positions along the extension plates 120.

FIG. 16 shows an embodiment using a cam mechanism. In the embodiments of FIGS. 12 to 15, tightening of the bolts can be troublesome due to limited access near the brackets 130. Square necked bolts located in square holes in the respective member facilitate tightening, but the arrangement can still cause frustration.

In FIG. 16, a clamp member 340 has a guide web 342 which runs in a guide slot 344 in the wall of the box section 231.

The clamp member arrangement is similar to the FIGS. 14 and 15 arrangement. At the upper end of the upper leg portion 346 a cam 348 on a camshaft 350 is suspended between ears 352. Referring to the left-hand side of FIG. 16, the cam 348 is rotated fully anticlockwise, so that lower leg portion 354 is at the minimum inclination to the 'vertical' of the drawing. Referring to the right hand side of FIG. 16, the cam 348 has been rotated to urge the upper leg portion 346 towards the box section 231, causing the respective lower leg 354 to angle outwards to engage the groove wall 326.

To secure the clamp members 340 to the box section 231, lock screws 356 are provided in the side wall of the box section 231 and bear on the webs 342. Where a thin wall box section 321 is used, an inner plate, tapped to receive the screws 356 may be provided to avoid distortion of the box section 231.

The camshaft 350 may have a slot 357 for rotation or preferably lever 358 at one end to facilitate rotation of the cam 348. The cam 348 bears on the bracket 130. Bearing in mind that the box section 231 pivots relative to the brackets 130, to align the clamp members 340 with the pipe radius, it may be desirable to provide a wider bracket 130.

It is preferred that the clamp members 310, 340 extend along a radius of the pipe 300 to enhance the grip on the ridge walls 326, and so the box section 231 and clamp members 310 are allowed to swivel between the brackets, about the threaded shafts 131', 131". The distance between the plates 120 and the pipe surface at the location of the brackets 130 will vary with the pipe diameter, as mentioned above, and hence different length the clamp members 310 may be needed. The brackets may be securable at different positions on the plates 120 to avoid this, also the height of the members 310 within the box sections 231 may also be adjustable, for example as with the slot 320 in the embodiment of FIGS. 12 and 13.

However the depth of the channels 308 in the pipe surface may also vary considerably between pipes, even with pipes of the same outer diameter. Thus, with a shallow groove, the clamp member 310 may rest on the bottom of the groove and lift the plates 120 clear of the pipe surface. To overcome this, packing members may be provided between the plates 120 and the brackets 130.

Another clamp arrangement is shown in FIG. 18 and is similar to the arrangement of FIG. 16. The box section 231 pivots on threaded shafts 370 which screw into plates 372 within the box section 231. A spacer 374 surrounds shaft 370 between the box section wall and the bracket 130, and the unit is tightened by handwheels 376 fixed on the ends of the shafts 370. In place of cams 348 of FIG. 16, threaded studs 380 are threadedly mounted in captive nuts 382 the brackets 130 and turned by handwheels 384 to bear on the clamp members 340'. Bearing in mind that the box section 231 pivots about shafts 370 to align the clamp members with the pipe radius, the clamp members 340' must be sufficiently wide for the studs 380 to bear on the clamp members at different pivot angles.

In the embodiment of FIGS. 14 and 15 the upper and lower portions 312, 316 fo the clamp members 213 are in substantially parallel planes. More leverage may be obtained by angling the lower portion, as in FIGS. 16 to 19. The lower portion may preferablty be angled at 10 to 20 degrees (90−θ) to the upper portion.

FIG. 19 shows an arrangement for coupling the two clamp members 340' together to form a unit which is readily mounted on a box section 231 as seen in FIGS. 16 and 18. The arrangement is to prevent any twisting movement of the clamp members about the radial axis of the pipe. The webs 342' of the clamp members 340' are sandwiched between two parallel plates 386a, 386b and are a tight fit on pins 388 extending between the plates 386 but will pivot about the pins. As the upper legs 346' of the clamp members 340' are urged together, as by the studs 380 in the FIG. 18 embodiment, the clamp members 340' pivot about the pins 388.

It can be seen that the engagement between the stud 380 and the upper protion of the clamp member 340' may tend to pull the frame 102, 120 downwards towards the pipe surface.

The outer surface of a corrugated pipe, measured at the top of the pipe ridges, is not a perfect cylinder due to manufacturing tolerances in the pipe moulding and the pipe itself may bend. Thus, with a frame 102 or support plate 120 which extends only a relatively short distance along the pipe axis, the may be some tendency for the clamp unit to rock on the pipe surface.

Accordingly, as shown in FIG. 21, we provide extension members in the form of straps or plates which may be secured to the frame or plates 102, 120, and extend axially along the pipe. As will be clear from the foregoing description, it is difficult to provide the straps at the line of contact between the frame or extension plates 102, 120, and so the straps are provide to one side of this, and pins, for example formed by threaded studs, project from the straps down to the pipe surface. In jurisdictions which allow for the outer surface of the pipe to be penetrated, the pins -or studs may be screwed into the pipe wall. FIG. 21 shows one such arrangement in schematic outline, with strap 420 formed of heavy gauge material to resist flexing secured to the outer end of extension plates 120 by screws 421. Contact members on the form of threaded studs 422 are screwed into the straps to bear on the upper surface of corrugations. The position of the studs along the strap may be adjusted. The studs may be arranged to screw into the pipe outer wall to provide a fixing, or otherwise may be arranged to bear on the surface and may be capped, for example, to prevent damage to the outer surface.

In the embodiment of FIG. 22, the strap 420 is clamped to the extension plates 120, allowing movement of the straps axially along the pipe. The plates 120 are sandwiched between an upper strap 424 and strap 420, the straps 420, 424 being urged together by a stud and wing nut arrangement 426, for example.

FIG. 22*a* shows the extension plates 120*a*, 120*b* formed in a Vshape, and FIG. 22*b* shows the plates formed as separate halves 120*a'*, 120*a"* and 120*b'*, 120*b"*.

Other modifications will be apparent to those in the art.

The invention claimed is:

1. An apparatus for mounting a drill stand on a pipe having a circumferentially extending groove or grooves in an outer surface of the pipe, comprising a platform for the drill stand, the platform having a pair of support members which, in use, are presented to the pipe and define between them an angle, and a clamp having a pair of clamp members which, in use, extend into the or a respective groove, and means for urging the clamp members against walls of the groove(s), thereby gripping the pipe wherein the clamp members, in use, are pivotably mounted to be orientable along a radius of the pipe.

2. An apparatus as claimed in claim 1, wherein a threaded member is provided to bias a clamp member against a groove wall.

3. Apparatus for attaching a frame to a corrugated pipe surface, the apparatus comprising a gripping member movably mounted on the frame, and means for urging the gripping member into engagement with the sidewall of a pipe corrugation wherein two gripping members are provided and wherein pivotal mounting means is provided for pivotally mounting the gripping members on the frame for the members to orient along a radius of the pipe.

4. Apparatus as claimed in claim 3, wherein the frame rests on the outer surface of the pipe, and an axial extension member extending from the frame, axially of the pipe, to inhibit rocking of the frame on the pipe.

5. Apparatus as claimed in claim 4, wherein a contact member is mounted in the axial extension member and is adjustable to bear on the pipe surface.

* * * * *